United States Patent
Walker

(10) Patent No.: US 11,586,566 B2
(45) Date of Patent: *Feb. 21, 2023

(54) MEMORY PROTOCOL WITH COMMAND PRIORITY

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/315,871

(22) Filed: May 10, 2021

(65) Prior Publication Data

US 2021/0263867 A1    Aug. 26, 2021

Related U.S. Application Data

(63) Continuation of application No. 15/613,408, filed on Jun. 5, 2017, now Pat. No. 11,003,602.

(60) Provisional application No. 62/449,689, filed on Jan. 24, 2017.

(51) Int. Cl.
    *G06F 13/18*     (2006.01)
    *G06F 13/26*     (2006.01)
    *G06F 3/06*      (2006.01)
    *G06F 12/02*     (2006.01)

(52) U.S. Cl.
    CPC ............ *G06F 13/18* (2013.01); *G06F 3/0611* (2013.01); *G06F 3/0629* (2013.01); *G06F 3/0656* (2013.01); *G06F 3/0679* (2013.01); *G06F 12/0246* (2013.01); *G06F 13/26* (2013.01); *G06F 2212/7203* (2013.01)

(58) Field of Classification Search
    CPC ........ G06F 13/18; G06F 13/26; G06F 3/0659; G06F 9/30; G06F 12/0246; G06F 3/0656; G06F 3/0629; G06F 3/0611; G06F 3/0679

See application file for complete search history.

(56) References Cited

U.S. PATENT DOCUMENTS

| | | |
|---|---|---|
| 5,452,311 A | 9/1995 | Wells et al. |
| 5,574,944 A | 11/1996 | Stager |
| 5,590,345 A | 12/1996 | Barker et al. |
| 5,774,683 A | 6/1998 | Gullick |
| 5,937,423 A | 8/1999 | Robinson |
| 7,480,754 B2 | 1/2009 | Priborsky |

(Continued)

FOREIGN PATENT DOCUMENTS

| | | |
|---|---|---|
| EP | 2530600 A2 | 12/2012 |
| EP | 2645263 A2 | 10/2013 |
| WO | 2010002753 A1 | 1/2010 |

OTHER PUBLICATIONS

Office Action from Korean patent application No. 10-2019-7024511, dated Jan. 12, 2021, 11 pages.

(Continued)

*Primary Examiner* — Jason W Blust
(74) *Attorney, Agent, or Firm* — Brooks, Cameron & Huebsch, PLLC

(57) ABSTRACT

The present disclosure includes apparatuses and methods related to a memory protocol with command priority. An example apparatus can execute a command that includes a read identification (RID) number based on a priority assigned to the RID number in a register. The apparatus can be a non-volatile dual in-line memory module (NVDIMM) device.

20 Claims, 5 Drawing Sheets

(56) References Cited

U.S. PATENT DOCUMENTS

| | | |
|---|---|---|
| 7,711,889 B2 | 5/2010 | Kudo et al. |
| 7,904,644 B1 | 3/2011 | Pinvidic et al. |
| 7,924,521 B1 | 4/2011 | Hudiono et al. |
| 7,983,107 B2 | 7/2011 | Moshayedi et al. |
| 8,719,492 B1 | 5/2014 | Asnaashari |
| 8,874,831 B2 | 10/2014 | Lee et al. |
| 9,128,634 B1 | 9/2015 | Kang et al. |
| 2003/0033461 A1 | 2/2003 | Malik |
| 2003/0110322 A1 | 6/2003 | Wolrich et al. |
| 2004/0059881 A1 | 3/2004 | Carr |
| 2004/0148482 A1 | 7/2004 | Grundy et al. |
| 2004/0260908 A1 | 12/2004 | Malik et al. |
| 2005/0160320 A1 | 7/2005 | Elez |
| 2008/0082751 A1 | 4/2008 | Okin et al. |
| 2008/0162735 A1 | 7/2008 | Voigt |
| 2008/0189452 A1 | 8/2008 | Merry et al. |
| 2008/0195800 A1 | 8/2008 | Lee et al. |
| 2008/0270678 A1 | 10/2008 | Cornwell et al. |
| 2009/0006787 A1 | 1/2009 | De Souza et al. |
| 2009/0138665 A1 | 5/2009 | Suzuki |
| 2009/0164869 A1 | 6/2009 | Chuang |
| 2009/0276556 A1 | 11/2009 | Huang |
| 2010/0077175 A1 | 3/2010 | Wu |
| 2010/0115142 A1 | 5/2010 | Lim |
| 2010/0250827 A1 | 9/2010 | Jullien et al. |
| 2010/0312950 A1 | 12/2010 | Hsieh |
| 2011/0170346 A1 | 7/2011 | Nagai et al. |
| 2011/0320651 A1 | 12/2011 | Poublan et al. |
| 2012/0020161 A1 | 1/2012 | Haukness |
| 2012/0131253 A1 | 5/2012 | McKnight et al. |
| 2012/0159052 A1 | 6/2012 | Lee et al. |
| 2012/0278664 A1 | 11/2012 | Kazui |
| 2013/0060981 A1 | 3/2013 | Horn et al. |
| 2013/0212319 A1 | 8/2013 | Hida |
| 2013/0262761 A1 | 10/2013 | Oh |
| 2014/0047206 A1 | 2/2014 | Ochiai |
| 2014/0108714 A1 | 4/2014 | Lee |
| 2014/0229699 A1 | 8/2014 | Gurgi et al. |
| 2014/0240326 A1 | 8/2014 | Culter et al. |
| 2014/0269088 A1 | 9/2014 | Pichen |
| 2014/0344512 A1 | 11/2014 | Nishioka |
| 2014/0351492 A1 | 11/2014 | Chen |
| 2015/0006794 A1 | 1/2015 | Kang |
| 2015/0052318 A1 | 2/2015 | Walker |
| 2015/0067291 A1 | 3/2015 | Miyamoto |
| 2015/0212738 A1 | 7/2015 | D'eliseo et al. |
| 2015/0234601 A1 | 8/2015 | Tsai et al. |
| 2015/0279463 A1 | 10/2015 | Berke |
| 2015/0331638 A1 | 11/2015 | Zaltsman et al. |
| 2015/0363106 A1 | 12/2015 | Lim et al. |
| 2016/0026577 A1 | 1/2016 | Goodwin |
| 2016/0041907 A1 | 2/2016 | Jung et al. |
| 2016/0070483 A1 | 3/2016 | Yoon et al. |
| 2016/0118121 A1 | 4/2016 | Kelly et al. |
| 2016/0232112 A1 | 8/2016 | Lee |
| 2016/0342487 A1 | 11/2016 | Ware |
| 2017/0160929 A1 | 6/2017 | Ayandeh |
| 2017/0308306 A1 | 10/2017 | Intrater |
| 2017/0351433 A1 | 12/2017 | Walker et al. |
| 2018/0260329 A1 | 9/2018 | Galbraith et al. |

OTHER PUBLICATIONS

Communication Pursuant to Article 94(3) EPC, European patent application No. 18 744 999.3-1224, dated Mar. 12, 2021, 5 pages.

Office Action from Chinese patent application No. 201780026941.4, dated Jul. 10, 2019, 12 pages.

Search Report from European patent application No. 17793026.0, dated Mar. 13, 2019, 7 pages.

International Search Report and Written Opinion from international patent application No. PCT/US2017/034487, dated Oct. 25, 2017, 22 pages.

International Search Report and Written Opinion from international patent application No. PCT/US2017/029780, dated Jul. 18, 2017, 11 pages.

Office Action from related Taiwanese patent application No. 107102386, dated Sep. 12, 2018, 15 pages.

International Search Report and Written Opinion from international patent application No. PCT/US2018/014345 dated Jun. 22, 2018, 15 pages.

Decision of Rejection from Taiwanese patent application No. 106114938, dated May 24, 2018, 6 pages.

Office Action from related Taiwanese patent application No. 106118556 dated May 11, 2018, 10 pages.

Office Action from related Taiwanese patent application No. 106114938, dated Jan. 18, 2018, 7 pages.

Fig. 3A

| RID 0:99, LOW | RID 100:199, HIGH | RID 200:299, MEDIUM | RID 300:399, LOW | RID MAX RID-99:MAX RID, LOW |
|---|---|---|---|---|

| RID RANGE | PRIORITY |
|---|---|
| RID 0:99 — 350-1 | LOW — 352-1 |
| RID 100:199 — 350-2 | HIGH — 352-3 |
| RID 200:299 — 350-3 | MEDIUM — 352-2 |
| RID 300:399 — 350-4 | LOW — 352-1 |
| RID MAX RID-99:MAX RID — 350-M | LOW — 352-1 |

| RID RANGE | PRIORITY |
|---|---|
| RID 0:99 — 350-1 | HIGH — 352-3 |
| RID 100:199 — 350-2 | HIGH — 352-3 |
| RID 200:299 — 350-3 | HIGH — 352-3 |
| RID 300:399 — 350-4 | HIGH — 352-3 |
| RID MAX RID-99:MAX RID — 350-M | HIGH — 352-3 |

318-1, 318-2, 318-3, 318-4, 318-M

| | RID RANGE | |
|---|---|---|
| PRIORITY | UPPER RID | LOWER RID |
| HIGH | 199 | 100 |
| HIGH | 499 | 400 |
| HIGH | X+99 | X |
| MEDIUM | 299 | 200 |
| MEDIUM | Y+99 | Y |
| MEDIUM | Z+99 | Z |
| LOW | 99 | 0 |
| LOW | 399 | 300 |
| LOW | MAX RID | MAX RID-99 |

MEMORY PROTOCOL WITH COMMAND PRIORITY

PRIORITY INFORMATION

This application is a Continuation of U.S. application Ser. No. 15/613,408, filed on Jun. 5, 2017, which claims benefit of U.S. Provisional Application No. 62/449,689 filed Jan. 24, 2017, the specification of which is incorporated herein by reference.

TECHNICAL FIELD

The present disclosure relates generally to memory devices, and more particularly, to apparatuses and methods for a memory protocol with command priority.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

BRIEF DESCRIPTION OF THE DRAWINGS

FIGS. 3A-3D are diagrams of a number of registers in accordance with a number of embodiments of the present disclosure.

DETAILED DESCRIPTION

Figure 1A:
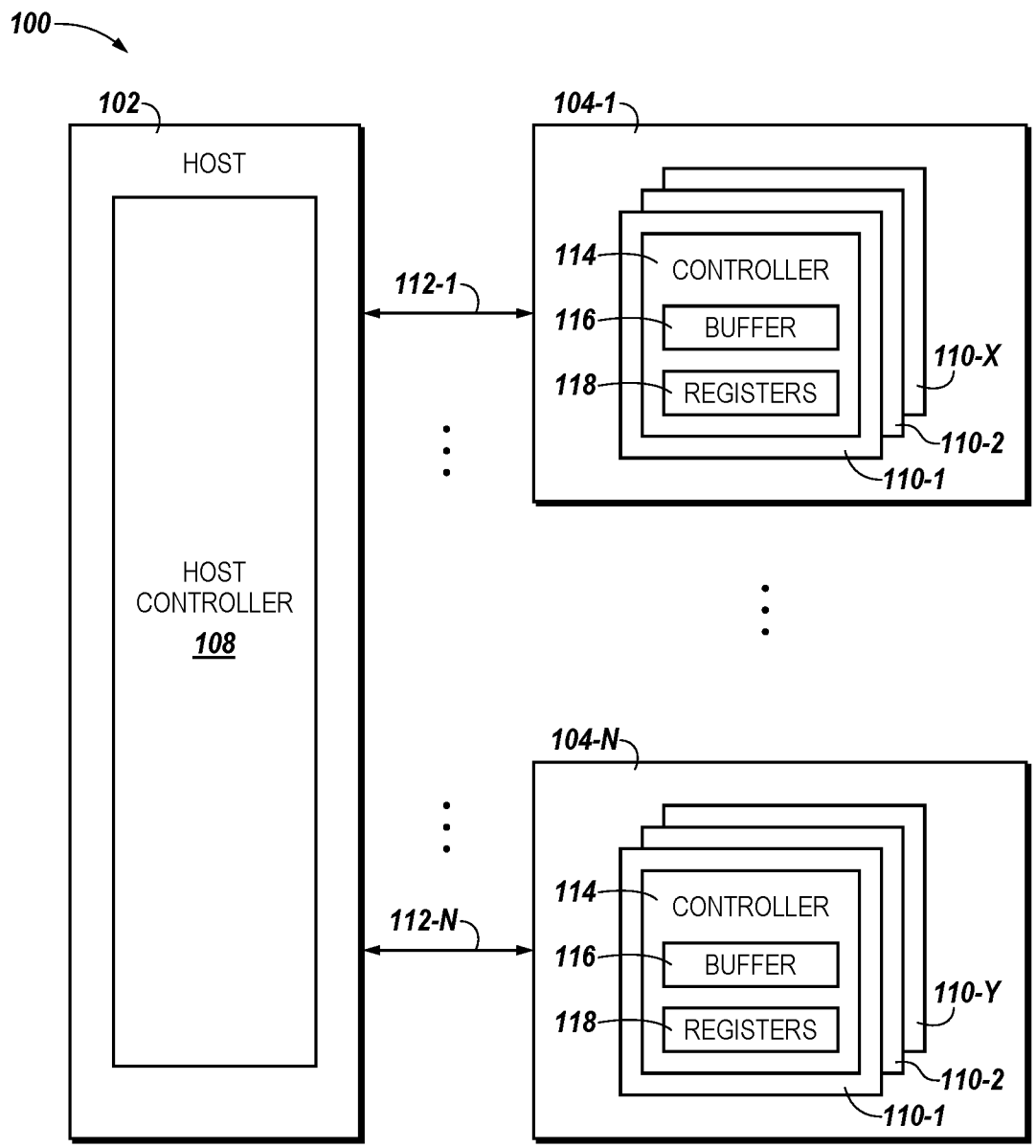
FIG. 1A is a block diagram of an apparatus in the form of a computing system including a memory system in accordance with a number of embodiments of the present disclosure.

The present disclosure includes apparatuses and methods related to a memory protocol with command priority. An example apparatus can execute a command that includes a read identification (RID) number based on a priority assigned to the RID number in a register.

In a number of embodiments, a host can send a number of commands to an apparatus. Each of the number of commands can be assigned read identification (RID) numbers that can be used to determine a priority associated the number of commands. The apparatus can locate a priority for the number of commands in a register or number of registers. The register(s) can have priorities assigned to ranges of RIDs. The apparatus can execute the commands from highest to lowest priority based on the priority information in the register(s). The register(s) can updated by the host to change priority information for assigned to the ranges of RIDs. The registers can also be updated by the host to change the ranges of RIDs assigned to the priority information. The register(s) can be updated by the host before commands are sent to the apparatus, so that the commands sent to the apparatus will be executed based on the priority information in the register(s). The register(s) can be updated by the host after commands have been sent to the apparatus, so that the priority of the commands sent to the apparatus will change and are executed based on the updated priority information in the register(s).

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1A is a functional block diagram of a computing system 100 including an apparatus in the form of a number of memory systems 104-1 ... 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory systems 104-1 . . . 104-N can include one or more memory modules, such as dual in-line memory modules (DIMM) 110-1, . . . , 110-X, 110-Y, for example. Memory systems 104-1 . . . 104-N can include any type of memory device, such as DIMMs with memory, which will be described in association with FIGS. 1A and 1B. The DIMMs 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1A-5 use a DIMM as the memory module, but the protocol of the present disclosure can be used on any memory system where memory can execute non-deterministic commands. In FIG. 1A, memory system 104-1 is coupled to the host via channel 112-1 can include DIMMs 110-1, . . . , 110-X, where DIMM 110-1 is a NVDIMM and 110-X is DRAM DIMM. In this example, each DIMM 110-1, . . . , 110-X, 110-Y includes a controller 114. Controller 114 can received commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, . . . , 110-X, 110-Y using the protocol of the present disclosure and/or a prior protocol, depending on the type of memory in the DIMM. For example, the host can use the protocol of the present disclosure to communicate on the same channel (e.g., channel 112-1) with a NVDIMM and a prior protocol to communicate with a DRAM DIMM that are both on the same memory system. The host and the NVDIMM can communicate via read ready (R_RDY) signals, read send (R_SEND) signals, write credit increment (WC_INC) signals, and read identification (RID) signals according the protocol of the present disclosure. The read ready (R_RDY) signals, read send (R_SEND) signals, write credit increment (WC_INC) signals, and read identification (RID) signals can be sent via pins that are unused in a prior protocol (e.g. DDR4) or are pins from a prior protocol (e.g. DDR4) that are repurposed (e.g. used differently) so that the present protocol is compatible with the prior protocol. Also, pins can be assigned to the read ready (R_RDY) signals, read send (R_SEND) signals, write credit increment (WC_INC) signals, and read identification (RID) signals in protocols that are being developed (e.g., DDR5).

As illustrated in FIG. 1A, a host 102 can be coupled to the memory systems 104-1 . . . 104-N. In a number of embodiments, each memory system 104-1 . . . 104-N can be coupled to host 102 via a channel. In FIG. 1A, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the DIMMs 110-1, . . . , 110-X, 110-Y via channels 112-1 . . . 112-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and DIMMs 110-1, . . . , 110-X, 110-Y on a number of buses, such as a data bus and/or an address bus, for example, via channels 112-1 . . . 112-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) coupled to a printed circuit board including a physical interface. Also, each DIMM 110-1, . . . , 110-X, 110-Y can include buffers 116 of volatile and/or non-volatile memory and registers 118. Buffer 116 can be used to buffer data that is used during execution of read commands and/or write commands. The buffer 116 can be split into a write buffer and a read buffer. The amount of space that is dedicated to the write buffer and the amount of space dedicated to the read buffer can be controlled by the host controller 108. The host can control the amount of space in the buffer 116 dedicated to the write buffer and the read buffer based on the type of commands that are being sent to a particular DIMM. In a number of embodiments, the DIMM can have a fixed write buffer size and/or a fixed read buffer size. Registers 118 can be programmed with priority information to determine priority for executing commands.

The DIMMs 110-1, . . . , 110-X, 110-Y can provide main memory for the memory system or could be used as additional memory or storage throughout the memory system. Each DIMM 110-1, . . . , 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1A can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the DIMMs 110-1, . . . , 110-X, 110-Y. It will be appreciated by those skilled in the art that the number of address input connections can depend on the density and architecture of the DIMMs 110-1, . . . , 110-X, 110-Y.

Figure 1B:
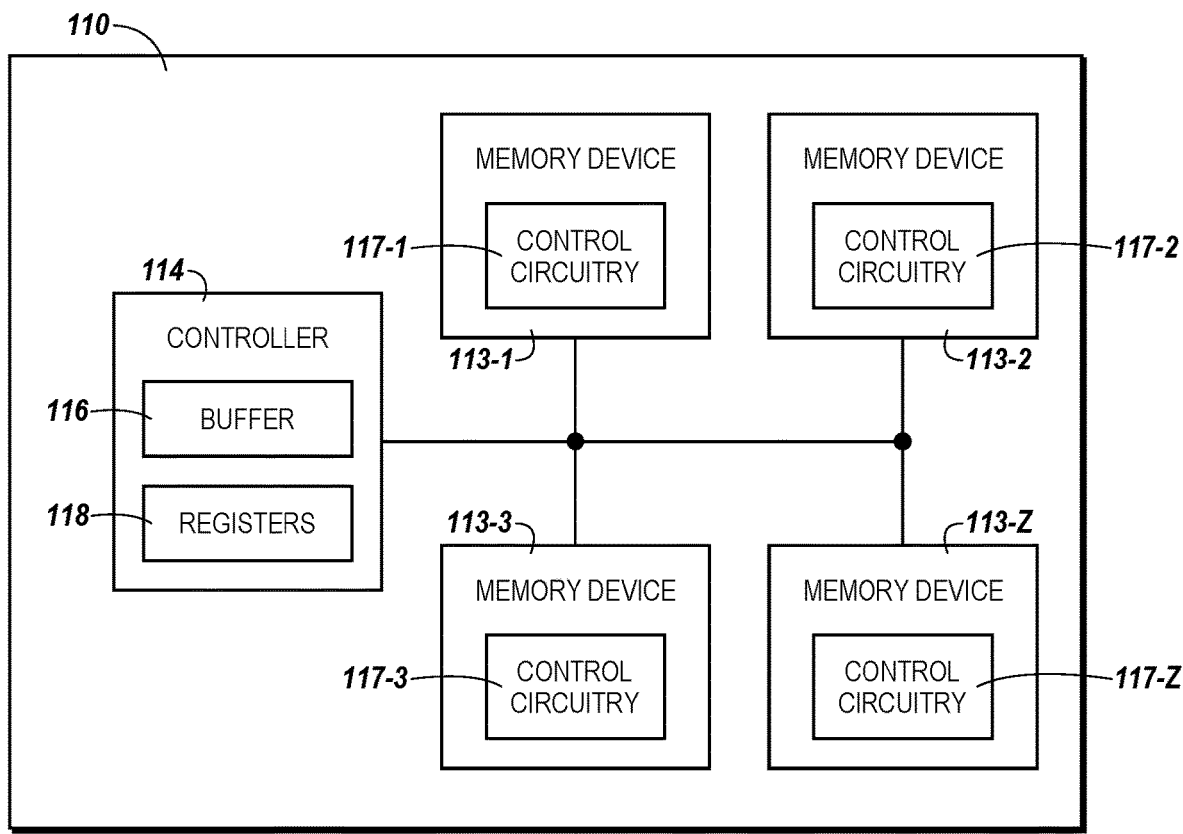
FIG. 1B is a block diagram of an apparatus in the form of a dual in-line memory modules (DIMM) in accordance with a number of embodiments of the present disclosure.

FIG. 1B is a block diagram of an apparatus in the form of a dual in-line memory modules (DIMM) 110 in accordance with a number of embodiments of the present disclosure. In FIG. 1B, DIMM 110 can include a controller 114. Controller 114 can include memory, such as SRAM memory, that can be a buffer 116 and/or a number of registers 118. DIMM 110 can include a number of memory devices 113-1, . . . , 113-Z coupled to the controller. Memory devices 113-1, . . . , 113-Z can include non-volatile memory arrays and/or volatile memory arrays. Memory devices 113-1, . . . , 113-Z can include control circuitry 117 (e.g., hardware, firmware, and/or software) which can be used to execute commands on the memory devices 113-1, . . . , 113-Z. The control circuitry 117 can receive commands from controller 114. The control circuitry 117 can be configured to execute commands to read and/or write data in the memory devices 113-1, . . . , 113-Z.

Figure 2A:
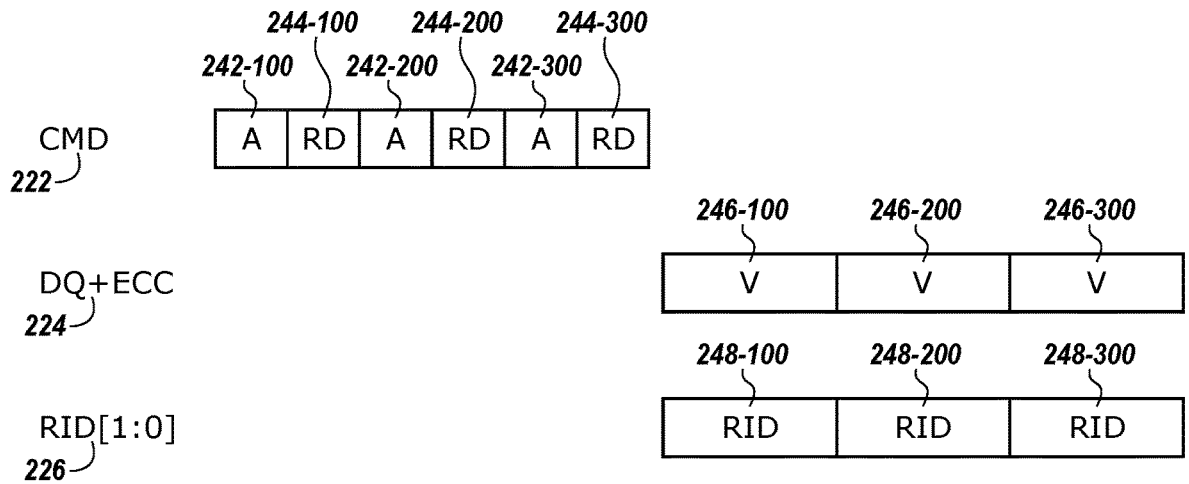
FIGS. 2A-2B are diagrams of a number of operations in accordance with a number of embodiments of the present disclosure.
Figure 2B:
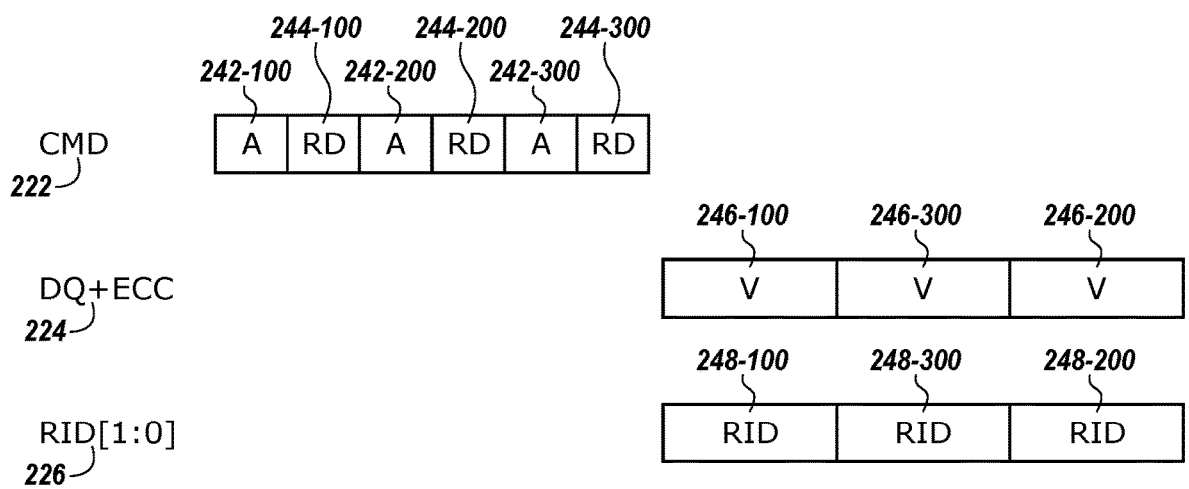

FIGS. 2A-2B are diagrams of a number of operations in accordance with a number of embodiments of the present disclosure. FIG. 2A illustrates an example of performing three read operations. A command signal 222 can be sent from the host to the NVDIMM. Command signal 222 can include activate commands and read commands. In FIG. 2A, a first activate command 242-100, a first read command 244-100, a second activate command 242-200, a second read command 244-200, a third activate command 242-300, and a third read command 244-300 are sent from the host to the NVDIMM. The host can assign a host read identification (RID) number to the read command. The host RID number can be included in the read command and transmitted to the NVDIMM when sending the read command from the host to the NVDIMM. In FIG. 2A, first read command 244-100 can be assigned a host RID of 100, the second read command 244-200 can be assigned a host RID of 200, and the third read command 244-300 can be assigned a host RID of 300. The host can assign host RID numbers based on the priority information in a number of registers. For example, if the host would like a command to be executed before other commands, the host can assign an RID to the command that is in a range of RIDs assigned high priority in the register(s).

In the protocol of the present disclosure, the read commands can be sent one after another without regard to timing parameters. This allows commands to be sent sooner than having to space the commands out due to clock timing parameters, therefore the NVDIMM can start processing the commands sooner which can reduce latency for the commands.

In FIG. 2A, once the NVDIMM has received the read commands 244-100, 244-200, and 244-300, the NVDIMM can determine the priority associated with the commands. The NVDIMM can inspect the register or registers to locate the priority associated with the RIDs of commands 244-100, 244-200, and 244-300. The register can be programmed before and/or after commands are sent from the host to the NVDIMM. In the example described in FIG. 2A, the registers are programmed before the commands are sent to the NVDIMM. For example, the register can assigned high priority to commands with RIDs 100 to 199, medium priority to commands with RIDs 200 to 299, and low priority to commands with RIDs 300 to 399. Command 244-100 would have high priority and can be executed first, command 244-200 would have medium priority and can be executed once all commands with high priority have been executed, and command 244-300 would have low priority and can be executed once all command with high priority and medium priority have been executed.

Since command 244-100 can be execute first in response to having high priority, the NVDIMM can inspect the buffer and/or cache of the NVDIMM and in the non-volatile memory of the NVDIMM to locate the data associated with the read commands 244-100. Once the controller locates the data and has the data ready to send back to the host, the NVDIMM controller can send a read ready command to the host. When a NVDIMM receives a number of read commands, the NVDIMM controller returns data associated the read commands based on priority information in a register or registers. For example, the read command includes an RID and the NVDIMM controller locates the RID in a register that assigns a priority to the read command based on the RID of the command.

In FIG. 2A, read command 244-100 can include an RID that indicates the command 244-100 is to be returned with high priority. A read ready indicator can be sent to the host by toggling (e.g., transitioning) a read ready signal from low to high or high to low to indicate that the data associated command 244-100 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with command 244-100. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-100 associated with command 244-100 on the DQ+ECC pins 224. Also, a read identification (RID) signal 248-100 is sent to the host on the RID pins 226 when data 246-100 is sent to the host. The RID signal 248-100 includes the memory device RID number assigned to the chunk of data by the NVDIMM and is used to identify the read command associated with data 246-100 that is sent to the host. Data 246-100 is assigned a memory device RID number of 100. Due to the NVDIMM command being able to respond to read commands in an order that is different to the order in which the read commands are received, the host will not know with which read command a particular data transmission is associated without the RID signal. The RID signal can include n-bits, where n is 1 or more bits. For example, the RID signal can be transmitted on a 2 bit RID bus. The number of outstanding reads the host can issue can be dependent on the number of bits in the RID signal, the number of beats in the data packet, and the number of reads the NVDIMM controller can support. For example, if the data burst is 8 beats and the RID signal is 2 bits, the number of outstanding reads that the host can issue is $2^{2*8}$=65,536. Also, a NVDIMM may have a register that can be read by the host to further restrict the number of outstanding read commands that the host can issue and the host can keep track of the number of outstanding reads that the host has issued.

In FIG. 2A, read command 244-200 can include an RID that indicates the command 244-200 is to be returned with medium priority. Since command 244-100 has been executed and there are no other commands with high priority to execute, command 244-200 can be executed. A read ready indicator can be sent to the host by toggling (e.g., transitioning) a read ready signal from low to high or high to low to indicate that the data associated read command 244-200 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-200. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-200 associated with read command 244-200 on the DQ+ECC pins 224. Also, a read identification (RID) signal 248-200 is sent to the host on the RID pins 226 when data 246-200 sent to the host. The RID signal 248-200 includes the memory device RID number assigned to the chunk of data by the NVDIMM and is used to identify the read command associated with data 246-200 that is sent to the host. Data 246-200 is assigned a memory device RID number of 200.

In FIG. 2A, read command 244-300 can include an RID that indicates the command 244-300 is to be returned with low priority. Since commands 244-100 and 244-200 have been executed and there are no other commands with high or medium priority to execute, command 244-300 can be executed. A read ready indicator can be sent to the host by toggling (e.g., transitioning) a read ready signal from low to high or high to low to indicate that the data associated read command 244-300 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-300. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-300 associated with read command 244-300 on the DQ+ECC pins 224. Also, a read identification (RID) signal 248-300 is sent to the host on the RID pins 226 when data 246-300 sent to the host. The RID signal 248-300 includes the memory device RID number assigned to the chunk of data by the NVDIMM and is used to identify the read command associated with data 246-300 that is sent to the host. Data 246-300 is assigned a memory device RID number of 300.

In a number of embodiments, a read send signal can be pulsed from low to high to low or a SEND command can be used to indicate that the host is ready to receive data. The pulsed read send signal can be timed by the host to coordinate with other signals sent to DIMMs on a common channel, which are typically captured with a clock edge, where some of the DIMMs may or may not be using the protocol of the present disclosure.

FIG. 2B illustrates an example of performing three read operations. In the example of FIG. 2B, the priority for the commands can be changed after the command are sent to the NVDIMM. In FIG. 2B, a first activate command 242-100, a first read command 244-100, a second activate command 242-200, a second read command 244-200, a third activate command 242-300, and a third read command 244-300 are sent from the host to the NVDIMM. The host can assign a host read identification (RID) number to the read command. The host RID number can be included in the read command and transmitted to the NVDIMM when sending the read command from the host to the NVDIMM. In FIG. 2A, first read command 244-100 can be assigned a host RID of 100, the second read command 244-200 can be assigned a host RID of 200, and the third read command 244-300 can be assigned a host RID of 300.

In the protocol of the present disclosure, the read commands can be sent one after another without regard to timing parameters. This allows commands to be sent sooner than having to space the commands out due to clock timing parameters, therefore the NVDIMM can start processing the commands sooner which can reduce latency for the commands.

In FIG. 2B, once the NVDIMM has received the read commands 244-100, 244-200, and 244-300, the NVDIMM can determine the priority associated with the commands. The NVDIMM can inspect the register or registers to locate the priority associated with the RIDs of commands 244-100, 244-200, and 244-300. The register can be programmed before and/or after commands are sent from the host to the NVDIMM. In the example described in FIG. 2B, the registers are programmed before the commands are sent to the NVDIMM and then updated after the commands have been sent to the NVDIMM. For example, the register initially be programmed to assigned high priority to commands with RIDs 100 to 199, medium priority to commands with RIDs 200 to 299, and low priority to commands with RIDs 300 to 399. Once the commands have been sent to the NVDIMM, the register updated to assigned high priority to commands with RIDs 100 to 199 and 300 to 399 and medium priority to commands with RIDs 200 to 299. The host can update the register to change the priority for the commands. The host can update the priority in response to a command being in the queue for a threshold period of time, for example. Also, the host can update the priority in response the host having a time sensitive need for the data associated with the command, for example. Commands 244-100 and 244-300 would have high priority and can be executed before commands with medium and/or low priority and command 244-200 would have medium priority and can be executed once all commands with high priority have been executed.

Since command 244-100 can be execute first in response to having high priority, the NVDIMM can inspect the buffer and/or cache of the NVDIMM and in the non-volatile memory of the NVDIMM to locate the data associated with the read commands 244-100. Once the controller locates the data and has the data ready to send back to the host, the NVDIMM controller can send a read ready command to the host. When a NVDIMM receives a number of read commands, the NVDIMM controller returns data associated the read commands based on priority information in a register or registers. For example, the read command includes an RID and the NVDIMM controller locates the RID in a register that assigns a priority to the read command based on the RID of the command.

In FIG. 2B, read command 244-100 can include an RID that indicates the command 244-100 is to be returned with high priority. A read ready indicator can be sent to the host by toggling (e.g., transitioning) a read ready signal from low to high or high to low to indicate that the data associated command 244-100 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with command 244-100. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-100 associated with command 244-100 on the DQ+ECC pins 224. Also, a read identification (RID) signal 248-100 is sent to the host on the RID pins 226 when data 246-100 is sent to the host. The RID signal 248-100 includes the memory device RID number assigned to the chunk of data by the NVDIMM and is used to identify the read command associated with data 246-100 that is sent to the host. Data 246-100 is assigned a memory device RID number of 100.

In FIG. 2B, read command 244-300 can include an RID that indicates the command 244-300 is to be returned with medium priority. Since command 244-100 has been executed and command 244-300 is the remaining command with high priority, command 244-300 can be executed next. A read ready indicator can be sent to the host by toggling (e.g., transitioning) a read ready signal from low to high or high to low to indicate that the data associated read command 244-300 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-300. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-200 associated with read command 244-300 on the DQ+ECC pins 224. Also, a read identification (RID) signal 248-300 is sent to the host on the RID pins 226 when data 246-300 sent to the host. The RID signal 248-300 includes the memory device RID number assigned to the chunk of data by the NVDIMM and is used to identify the read command associated with data 246-300 that is sent to the host. Data 246-300 is assigned a memory device RID number of 300.

In FIG. 2B, read command 244-200 can include an RID that indicates the command 244-300 is to be returned with medium priority. Since commands 244-100 and 244-300 have been executed and there are no other commands with high priority to execute, command 244-200 can be executed. A read ready indicator can be sent to the host by toggling (e.g., transitioning) a read ready signal from low to high or high to low to indicate that the data associated read command 244-200 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-200. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the data 246-200 associated with read command 244-200 on the DQ+ECC pins 224. Also, a read identification (RID) signal 248-200 is sent to the host on the RID pins 226 when data 246-200 sent to the host. The RID signal 248-200 includes the memory device RID number assigned to the chunk of data by the NVDIMM and is used to identify the read command associated with data 246-200 that is sent to the host. Data 246-200 is assigned a memory device RID number of 200.

FIGS. 3A-3D are diagrams of a number of registers in accordance with a number of embodiments of the present disclosure. FIG. 3A includes register 318 assigns ranges of read identification (RID) numbers to priority information. In FIG. 3A, register 318 assigns RID range 350-1 (RID 0:99) to low priority 352-1, RID range 350-2 (RID 100:199) to high priority 352-3, RID range 350-3 (RID 200:299) to medium priority 352-2, RID range 350-4 (RID 300:399) to low priority 352-1, and RID range 350-M (RID MaxRID-99:MaxRID) to low priority 352-1. In a number of embodiments, any number of registers of any size can be used to assign priority to RIDs.

FIG. 3B includes registers 318-1, . . . , 318-M that assign ranges of read identification (RID) numbers to priority information. In FIG. 3B, register 318-1 assigns RID range 350-1 (RID 0:99) to low priority 352-1, register 318-2 assigns RID range 350-2 (RID 100:199) to high priority 352-3, register 318-3 assigns RID range 350-3 (RID 200:299) to medium priority 352-2, register 318-4 assigns RID range 350-4 (RID 300:399) to low priority 352-1, and register 318-M assigns RID range 350-M (RID MaxRID-99:MaxRID) to low priority 352-1. Registers 318-1, . . . , 318-M can be updated to change the RID range associated therewith. Also, registers 318-1, . . . , 318-M can be updated to change the priority information associated therewith.

In FIG. 3C, registers 318-1, . . . , 318-M can all be assigned the same priority information, such as high priority 352-3, for example. When all of the ranges of RIDs are assigned the same priority information, the commands are executed without regard to priority. The registers 318-1, . . . , 318-M can be updated to all have the same priority by the host when the host does not want to executed commands with priority.

FIG. 3D includes registers 318-H, 318-M, and 318-L that assign priority information to ranges of RIDs. In FIG. 3D, register 318-H assigns high priority to ranges of RIDs, register 318-M assigns medium priority to ranges of RIDs, and register 318-L assigned low priority to ranges of RIDs. Registers 318-H, 318-M, and 318-L can be updated to change the RID ranges so that the priority associated with commands having RIDs in RID ranges is updated. In FIG. 3D, register 318-H assigns high priority to RID ranges with a lower RID 360 of 100 and an upper RID 362 of 199, a lower RID 360 of 400 and an upper RID 362 of 499, and a lower RID 360 of x and an upper RID 362 of x+99. Register 318-M assigns medium priority to RID ranges with a lower RID 360 of 200 and an upper RID 362 of 299, a lower RID 360 of y and an upper RID 362 of y+99, and a lower RID 360 of z and an upper RID 362 of z+99. Register 318-L assigns low priority to RID ranges with a lower RID 360 of 0 and an upper RID 362 of 99, a lower RID 360 of 300 and an upper RID 362 of 399, and a lower RID 360 of MaxRID-99 and an upper RID 362 of MaxRID. The ranges of RIDs associated with registers 318-H, 318-M, and 318-L can includes any lower RID 360 and/or upper RID 362 that is available to assign to commands by the host and/or the NVDIMM.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device; and
   a controller coupled to the memory device configured to:
      program a set of registers that associate a number of ranges of read identification (RID) numbers with a number of priorities;
      reprogram the set of registers, prior to a command being executed, to update associating the number of ranges of read identification numbers (RIDs) with the number of priorities;
      assign, in response to reprogramming the set of registers, the updated priority to the command.

2. The apparatus of claim 1, wherein the controller is configured to execute the command based on the updated priority assigned to the command.

3. The apparatus of claim 1, wherein:
   the command is executed before another command based on the priority associated with the RID number; and
   the other command was sent to the memory device for execution prior to the command being sent to the memory device for execution.

4. The apparatus of claim 1, wherein each of the number of ranges of RID numbers are assigned priority information.

5. An apparatus, comprising:
   a memory device; and
   a controller coupled to the memory device configured to:
      assign, in response to receiving a plurality of commands, a plurality of priorities to the plurality of commands based on a range of read identification (RID) numbers and a plurality of registers associating the range of RID numbers with the plurality of priorities;
      reprogram the plurality of registers, prior to the plurality of commands being executed, to update associating the plurality of ranges of RID numbers with the plurality of priorities;
      assign, in response to reprogramming the plurality of registers, updated priorities to the plurality of commands.

6. The apparatus of claim 5, wherein the priority information includes high priority, medium priority, and low priority.

7. The apparatus of claim 6, wherein a first portion of the plurality of commands programmed to high priority are executed before other commands.

8. The apparatus of claim 6, wherein a second portion of the plurality of commands programmed to medium priority are executed after commands having RIDs assigned to registers with high priority.

9. The apparatus of claim 6, wherein a third portion of the plurality of commands programmed to low priority are executed after commands having RIDs assigned to registers with high or medium priority.

10. The apparatus of claim 6, wherein a first plurality of commands is executed first based on the high priority associated with a first range of RIDs, a second plurality of commands is executed second based on the medium priority associated with a second range of RIDs, and a third plurality of commands is executed third based on the low priority associated with a third range of RIDs.

11. The apparatus of claim 5, wherein the plurality of registers is programmed to associate high priority with a first range of RIDs, associate medium priority with a second range of RIDs, and associate low priority with a third range of RIDs.

12. The apparatus of claim 11, wherein the plurality of registers are reprogrammed to associate medium priority with the third range of RIDs and low priority with the second range of RIDs.

13. The apparatus of claim 12, wherein a third command is executed second based on the medium priority associated with the third range of RIDs and a second command is executed third based on the low priority associated with the second range of RIDs.

14. The apparatus of claim 5, wherein the controller is configured to execute a first command, a second command, and a third command in an order determined by the updated first priority of the first command, the updated second priority of the second command, and the updated third priority of the third command.

15. The apparatus of claim 5, wherein:
   the plurality of registers can be reprogrammed to change the priority information assigned to the registers; and
   the plurality of registers can be reprogrammed to change the ranges of RID numbers assigned to the registers.

16. The apparatus of claim 5, wherein the controller executes the first command, the second command, and the third command without prioritizing commands based on the priority information in the register.

17. A method, comprising:
   assigning, in response to a memory device receiving a command, a priority to the command based on a range of read identification (RID) numbers and a plurality of registers associating the number of ranges of RID numbers with the plurality of priorities;
   reprogramming the plurality of registers, prior to the command being executed, to update associating the number of ranges of RID numbers with the plurality of priorities;
   assigning, in response to reprogramming the plurality of registers, the updated plurality of priorities to the command.

18. The method of claim 17, further including determining the first portion of the plurality of commands have RID numbers that are associated with high priority registers.

19. The method of claim 17, further including determining a second portion of the plurality of commands have RID numbers that are associated with medium priority registers and are to be executed after the first portion based on RID numbers of the plurality of commands and the priority information of the plurality of registers.

20. The method of claim 17, further including reprogramming the plurality of registers to associate the plurality of priorities with the number of ranges of RID numbers after the command has been executed.

\* \* \* \* \*